United States Patent [19]
Grell et al.

[11] Patent Number: 5,815,538
[45] Date of Patent: Sep. 29, 1998

[54] METHOD AND APPARATUS FOR DETERMINING LOCATION OF A SUBSCRIBER DEVICE IN A WIRELESS CELLULAR COMMUNICATIONS SYSTEM

[75] Inventors: Conrad Grell, San Diego; Jeremy Guralnick, Encinitas; Ilan J. Rothmuller, San Diego; Chris Bennett, San Diego; Michael Theiss-Aird, Carlsbad, all of Calif.

[73] Assignee: Omniplex, Inc., San Diego, Calif.

[21] Appl. No.: 585,261

[22] Filed: Jan. 11, 1996

Related U.S. Application Data

[63] Continuation of Ser. No. 83,643, Jun. 25, 1993.

[51] Int. Cl.[6] ............................. H04B 7/185; G06F 15/20
[52] U.S. Cl. ......................... 375/356; 375/364; 342/357; 342/413; 364/460; 455/456
[58] Field of Search ..................................... 342/357, 356, 342/387, 358, 413, 450, 458; 364/460, 449.1; 379/58, 59; 455/32.1, 456, 457; 375/364, 356

[56] References Cited

U.S. PATENT DOCUMENTS

| | | | |
|---|---|---|---|
| 4,703,444 | 10/1987 | Storms, Jr. et al. | 364/460 |
| 4,791,422 | 12/1988 | Goddard | 342/389 |
| 4,884,208 | 11/1989 | Marinelli et al. | 364/460 |
| 4,891,650 | 1/1990 | Sheffer | 342/457 |
| 4,918,609 | 4/1990 | Yamawaki | 364/449.1 |
| 5,043,736 | 8/1991 | Darnell et al. | 342/357 |
| 5,056,106 | 10/1991 | Wang et al. | 342/450 |
| 5,119,102 | 6/1992 | Barnard | 342/357 |
| 5,119,504 | 6/1992 | Durboraw, II | 455/54.1 |
| 5,155,490 | 10/1992 | Spradley, Jr. | 342/357 |
| 5,208,756 | 5/1993 | Song | 364/449.1 |
| 5,327,144 | 7/1994 | Stilp et al. | 342/387 |
| 5,379,047 | 1/1995 | Yokev et al. | 342/457 |
| 5,432,841 | 7/1995 | Rimer | 379/59 |
| 5,513,111 | 4/1996 | Wortham | 364/460 |

FOREIGN PATENT DOCUMENTS

| | | |
|---|---|---|
| 0303371B1 | 2/1989 | European Pat. Off. . |
| WO 94/28432 | 12/1994 | WIPO . |

OTHER PUBLICATIONS

J. Brooks Chadwick et al., "A Vehicle Location System (VLS) Solution Approach," Proc. of IEEE Position Location and Navigation Symposium, pp. 127–132 (1990).

*Primary Examiner*—Edward L. Coles, Sr.
*Assistant Examiner*—Madeleine Au Nguyen
*Attorney, Agent, or Firm*—Hamilton, Brook, Smith & Reynolds, P.C.

[57] ABSTRACT

The location of a subscriber device in a wireless cellular communications system is established by transmitting digital data signals to a cellular digital data receiver of the subscriber device from at least three different cellular cell site transmitters at known locations. Each data signal has a time-synchronized synchronization signal, preferably synchronized through the time signals of the global positioning system. The time of arrival of each of the time-synchronized synchronization signals is determined with respect to an internal clock of the receiver. The location of the subscriber device is established from the locations of the cell sites and the times of arrival of the synchronization signals relative to the internal clock.

24 Claims, 5 Drawing Sheets

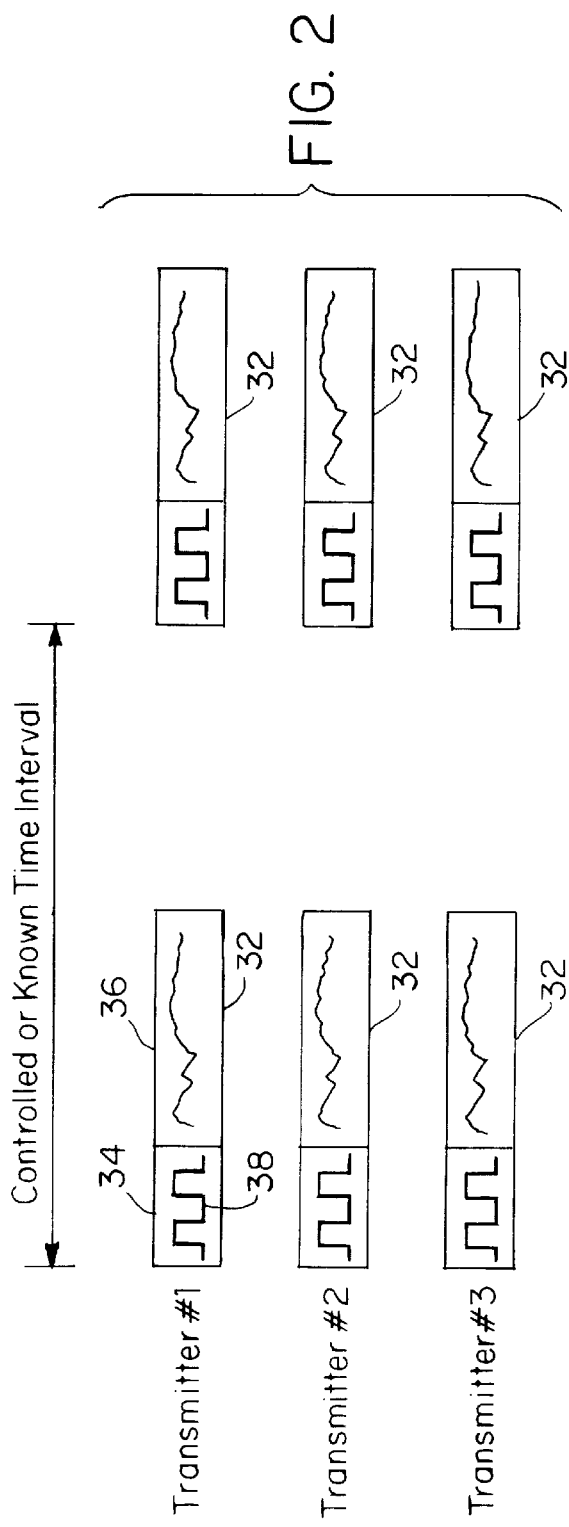
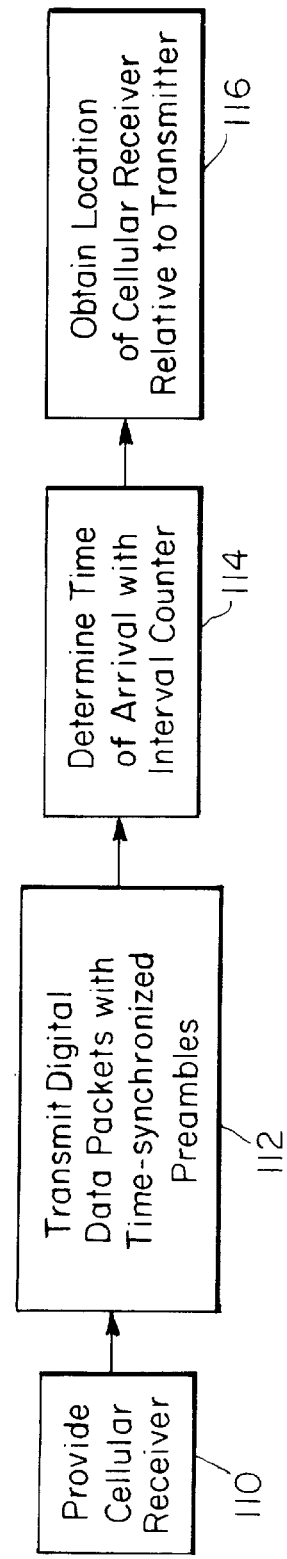

METHOD AND APPARATUS FOR DETERMINING LOCATION OF A SUBSCRIBER DEVICE IN A WIRELESS CELLULAR COMMUNICATIONS SYSTEM

RELATED APPLICATION

This application is a continuation of co-pending application Ser. No. 08/083,643 filed on Jun. 25, 1993, which is incorporated herein by reference in its entirety.

BACKGROUND OF THE INVENTION

This invention relates to the use of cellular telephone systems, and, more particularly, to determining the location of cellular receivers relative to cellular transmitters.

Automatic locationing systems have been in use for many years, and have a wide range of potential applications. Such applications include, for example, the location and recovery of stolen vehicles, tracking of commercial delivery vehicles, direction of emergency vehicles, assistance to lost drivers, and highway traffic control systems. To be commercially feasible in most applications, such systems must be accurate to 100 meters or better. They must also be usable in many areas, and must be based upon robust and inexpensive locationing devices.

One such approach utilizes the Global Positioning System (GPS) operated by the US Department of Defense. This technique is based upon triangulation using synchronized signals received from four or more of a set of satellites orbiting the earth. To take advantage of this approach, the user must have available a global positioning receiver of sufficient accuracy.

Another approach utilizes the cellular telephone system, which is now widely established in all urban areas and many rural areas of the United States, and in some other countries. Current cellular systems provide wireless analog voice service to mobile or stationary subscriber devices. A geographical area is usually divided into a number of overlapping cells, each with its own cell site transmitter/receiver. A subscriber device normally communicates with the strongest of the cell site signals available at the particular location of the subscriber device. In most instances, particularly in urban areas, the subscriber device can receive transmissions from a number of other cell sites as well.

In one approach to automated location determination using the cellular telephone system, the signal strengths of cellular signals are used to determine the distance of the receiver from a cell site transmitter. Such a system is described in U.S. Pat. No. 4,891,650. Signal strengths of several cell site transmitters can be used to find the location of the cellular receiver by signal strength triangulation.

The existing locationing approaches, such as those discussed above, have shortcomings that have inhibited their widespread adoption in many instances. Most are specifically designed for locationing applications, and so have required the construction of an infrastructure specifically to support the system. Consequently, it has proved difficult to devise inexpensive devices which would allow locationing services to be provided for the full range of accuracies and applications which could make use of them.

There is therefore a need for an accurate, inexpensive locationing system that can be used for a wide variety of applications. The present invention fulfills this need, and further provides related advantages.

SUMMARY OF THE INVENTION

The present invention provides a method and apparatus for determining the location of a cellular subscriber device through the cellular telephone system. The approach of the invention is implemented using relatively minor additions and upgrades to available cellular digital data equipment and software in the subscriber device. Relatively minor additions are made to the cell site equipment. Automated location determinations are accurate to within about 100 meters. A variety of levels of capability can be provided, but the basic cellular location-determining device can be made so inexpensively that it is a candidate for applications such as cargo tracking.

In accordance with the invention, a method for determining the location of a subscriber device utilizes a cellular subscriber device having a cellular digital data receiver system with a cellular digital data receiver device therein. The method includes transmitting time-synchronized synchronization signals to the cellular digital data receiver from at least three different cellular cell site transmitters at different, but known, locations. The nature of the synchronization signal will depend upon the characteristics of the digital data system being utilized in the cellular telephone system, and is preferably a signal that is already present in the system. For example, in the Cellular Digital Packet Data (CDPD) system, the synchronization signal is preferably provided by the "forward synchronization word" used to determine the start and the end of the fixed-size Reed-Solomon codewords in that system. The synchronization signals transmitted from different cell sites are synchronized to a common and highly accurate timing source, such as that provided by the global positioning system (GPS).

The relative time of arrival of each of the time-synchronized synchronization signals is determined with respect to one of them using an internal clock of the cellular digital data receiver system. The individual distances from the subscriber device to the cell sites are obtained from the relative times of arrival of the synchronization signals. The locations of the cell sites are determined by obtaining data transmitted by the cell sites giving their locations, or by other means such as tables held in the subscriber device. The position of the subscriber device is determined by triangulation using the arrival times, the relative distances, and the cell site locations so obtained.

The invention also extends to the apparatus required for the locationing system. Such apparatus comprises at least three cellular cell site transmitters/receivers and a cellular subscriber device. Each of the cell site transmitters includes means for providing a timing signal synchronized to a common time standard, means for transmitting a synchronization signal synchronized to the timing signal, and means for transmitting the location of the cell site (and, optionally, the locations of other cell sites). The subscriber device has a cellular digital data receiver operable to receive the synchronization signals and cell site location data transmitted from the cell sites, an internal clock, means for determining the time of arrival of each of the synchronization signals relative to the internal clock, and means for obtaining the position of the subscriber device relative to the three cell site transmitters from the times of arrival of the synchronization signals relative to the internal clock and from the locations of the transmitting cell sites.

In the present approach, each cell site transmits synchronization signals which are precisely synchronized to the common time reference signal, or are time displaced by a known displacement that can be used to correct the received synchronization signals. (As used herein "time-synchronized" means that signals are transmitted at the same time, within the limits of system error, or are displaced in time by some known amount that can be used to correct the received signals. Time displacements may be intentionally introduced to prevent unauthorized use of the locating approach of the invention, as will be described subsequently.) This time reference may be provided in any manner, but is preferably provided by the global positioning system. The GPS transmits signals that are precisely synchronized to within about 10 nanoseconds to locations throughout the world. These signals are available to all cell sites, and serve as the basis for transmitting the synchronization signals in such a way that they are synchronized across all participating cell sites. A subscriber device receives synchronization signals and, when necessary, cell site location data from at three cell site transmitters, which may be examined sequentially, or, in a suitably equipped subscriber device, simultaneously.

The subscriber device, however, does not have direct access to GPS timing signals, as it has no GPS receiver. The subscriber device therefore cannot directly calculate the time interval between transmission of the synchronization signal and its receipt, which would be a direct measure of distance from the cell site transmitter. Instead, the subscriber device synchronizes an internal clock to one of the synchronization signals, and determines the differences in the time of receipt for the other synchronization signals. If the cell sites are synchronized as suggested, the time displacement (phase difference) between the arrival times of the synchronization signals thus reflects the differing distances from the three cell site transmitters to the subscriber device. The subscriber device also obtains the location of the cell site transmitters, either from data transmitted from the cell sites or by other means. From this information, the location of the subscriber device can be obtained by triangulation.

The present invention is utilized in the cellular environment having the capability for transmitting digital data, which is now being introduced. Examples include the RAM, ARDIS, and CDPD systems. There are plans to replace analog voice transmissions with digital ones, using Time Division Multiple Access (TDMA). The individual data transmissions in systems which may make use of the invention are provided as a synchronous bit stream, at rates of 19.2 kbps or higher, and the different bit streams are separated from each other by use of different radio frequencies ("Frequency Division Multiplexing" (FDM)) or by distance ("spatial diversity"). The invention is not applicable to systems in which transmissions are based upon spread-spectrum techniques, such as Code Division Multiple Access (CDMA).

The minimum difference between a subscriber device capable of supporting locationing services and one which supports only the base digital data service consists of providing a sufficiently accurate internal clock and the necessary software to process the synchronization signals, the cell site location data, and the triangulation. Thus, in its most economical form, the location-determining subscriber device of the invention can be built for a cost which is only slightly greater than the cost of a standard subscriber device. At such a low cost, the cellular subscriber device with position locating capability becomes a useful tool for determining locations of many different objects that are desirably tracked or automatically located.

In its most basic form, the invention can be realized to determine the latitude and longitude of the subscriber device by using the method described based upon signals received from three cell sites. In an enhanced form of the invention, once an initial position has been determined using three cell sites, updates to the position can be determined using only two cell sites. In another enhanced form of the invention, in which at least four cell sites are used, the altitude of the subscriber device can also be determined. If signals can be obtained from more than the minimum number of cell sites required to support the service, then the accuracy of the service can be increased by reducing errors due to effects such as the geometric dilution of precision.

The technique may be combined with signal equalization techniques, to improve the accuracy of the system in locations which are subject to multipath effects, or with other techniques such as Kalman filtering to combat other potential sources of error. The technique may be combined with other locationing techniques, such as GPS or dead reckoning, so that the location of the subscriber device can be determined even when the signals from the minimum number of cell sites required are not available.

The synchronization signals may be displaced from their nominal values by amounts known only to legitimate subscriber devices in order to provide access control to locationing services. Subscriber devices may be built as receive-only devices, which provide location data to the subscriber, or they may be capable of transmitting location data back to a cell site, for example for purposes of tracking the location of a subscriber device remotely.

Other features and advantages of the invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 2 is a schematic drawing of the form of a synchronization signal;

FIG. 6 is a block flow diagram for the method of the invention; and

DETAILED DESCRIPTION OF THE PREFERRED EMBODIMENTS

Figure 1:
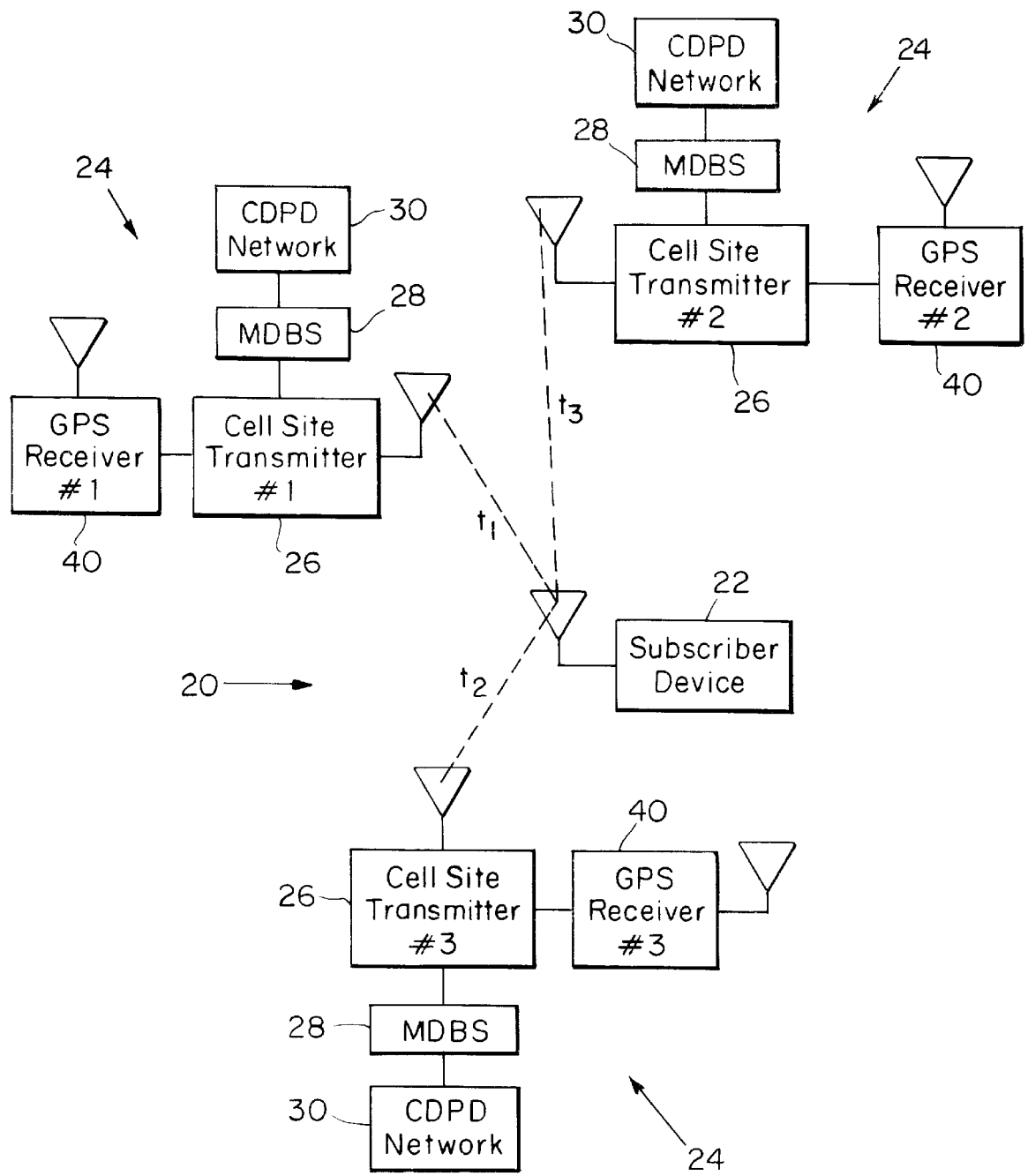
FIG. 1 is a schematic drawing of a cellular locationing system according to the present invention.

FIG. 1 depicts an apparatus 20 for determining the location of a subscriber device 22. The preferred embodiment is described for an implementation based upon the Cellular Digital Packet Data (CDPD) system. Other substantially similar implementations can be devised based upon other cellular digital transmission systems such as RAM, ARDIS, or TDMA. The apparatus 20 includes at least three cell sites that transmit radio signals to, and receive radio signals from, the subscriber device 22. From the relative time of arrival of synchronization signals and the known locations of the cell site transmitters 24, the absolute position of the subscriber device 22 is obtained.

Each cell site 24 includes a cell site transmitter 26 which transmits (and receives) cellular signals. Each cell site transmitter 26 is linked to a Mobile Base Data Station (MDBS), such as by land lines. The MDBS 28 is, in turn, linked to a CDPD network 30, again preferably by land lines. The MDBS 28 and CDPD network 30 are provided as part of an existing cellular system supporting CDPD.

The cell site transmitter 26 transmits digital data packets 32 with forward synchronization words 34, in addition to its conventional voice transmissions. Referring to FIG. 2, each cell site transmitter 26 transmits data packets 32 serially on a selected cellular channel. Each data packet 32 has two fields, a forward synchronization word 34 and a data field 36. The data field 36 is used to convey data in digital form between the cell site transmitter 26 and the subscriber device 22. The data field 36, while perhaps of great importance to the user of the subscriber device, does not contribute to the present invention except as follows. The data field 36 may be used to transmit data providing the identity and location of the transmitting cell sites 24 and other data relating to the management and operation of a locationing system, such as billing information, security and access data, and other housekeeping details.

The forward synchronization word 34 has a waveform structure 38 which is sufficiently uniform to render the forward synchronization words recognizable by the subscriber device 22. This: forward synchronization word 34 therefore serves as the basis for time of flight determinations that are used in obtaining the location of the subscriber device.

Figure 3:
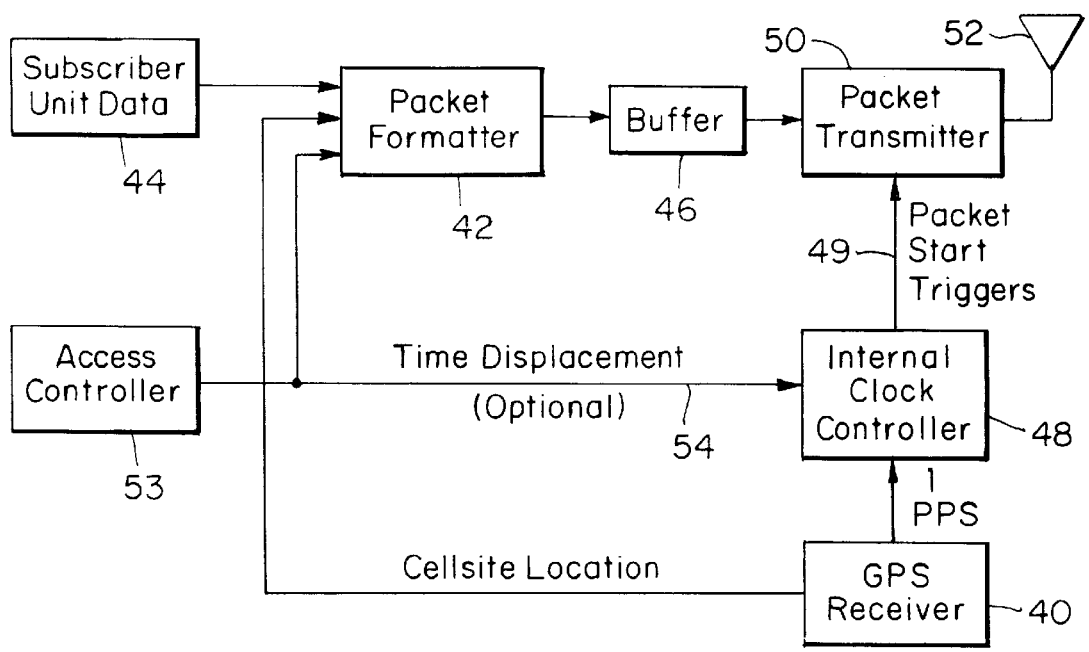
FIG. 3 is a block diagram of a cell site transmitter.

The cell site transmitters 26 are synchronized to transmit their respective forward synchronization words at precisely the same moment in time, within the limitations of system error. One form of the apparatus for synchronized transmission is depicted in FIG. 3. Each cell site transmitter 26 has a time source that is synchronized to the time source of each of the other cell site transmitters 26. Any operable synchronized time source that is synchronized to provide sufficient accuracy for the desired performance could be used. The most convenient and preferred of such synchronized time sources is a global positioning system (GPS) receiver 40.

Through the use of the GPS receiver 40 or by other means such as an accurate survey, the location of each cell site 24 can be precisely determined. Through the use of the GPS receiver, a time signal is available to each of the cell site transmitters 26, typically at a rate of once per second, which is synchronized to within 10 nanoseconds of nominal GPS timing across all participating cell sites at a modest cost compared to the cost of other components of cell site equipment.

The cell site location of the GPS receiver 40 and other management and housekeeping information for the locationing system are transmitted using means provided as part of the normal operation of the digital data services, at a sufficient frequency to support the operation of locationing service without impeding the operation of other services. The cell site location and subscriber unit data 44 to be transmitted are formatted into the digital data packet format shown in FIG. 2, by a packet formatter 42. The formatted digital data packets 32 are held in a buffer 46 and provided to a packet transmitter 50.

An internal clock controller 48 of each of the participating cell sites 24 is synchronized to transmit at the same time, according to the synchronization signal received from the GPS receiver 40. The GPS receiver normally produces one precisely synchronized pulse each second (1 pulse per second or pps) after correction for time of flight from the satellite and other correctable sources of error. That pulse, received at each of the participating cell sites 24, is provided to each respective internal clock controller 48 to serve as the basis for synchronizing a packet trigger signal 49 among all of the participating cell sites 24. The packet trigger signal 49 activates the packet transmitter 50, at the precisely synchronized moment, to transmit the formatted digital data packet 32 held in the buffer 46. The controller 48 thus adjusts the timing for the transmission of forward synchronization words through the antenna 52 to synchronize them appropriately with the time standard received by the GPS receiver 40. The digital information in the data packets, both the forward synchronization word 34 and the data field 36, is transmitted at a uniform bit rate, here 19.2 kilobits per second (kbps) in the preferred embodiment. The forward synchronization words 34 are synchronized to all other forward synchronization words 34 of data packets transmitted by the other cell site transmitters 26, with each cell site transmitter 26 transmitting one precisely timed forward synchronization word in every 420 transmitted bits. (The 1 pps synchronization signal serves as the basis for an accurate synchronization every 1 second, but the forward synchronization words can be transmitted more often under the assumption that any loss of synchronization in the period of one second between GPS synchronization pulses will be negligible.) The transmitted forward synchronization words 34 are available for receipt by the subscriber device 22.

The position locating feature of the present invention may be offered as a subscription payment feature of otherwise-conventional cellular systems with the digital data transmission feature. To permit the use of this feature only by paying subscribers, its use must be denied to all those who have not subscribed. Denial of access may be achieved by introducing a time displacement into the timing signal produced by the internal clock controller 48. The amount of the time displacement is derived by paying subscribers from encrypted information in data packets transmitted using the ordinary data transmission facilities of the system, or by other means. Only subscriber devices operated by paying subscribers are provided with the necessary key for determining the time displacement from the encrypted information, so that only subscriber devices operated by paying subscribers may obtain useful positioning information. (The data field 36 of each digital data packet 32 is normally encrypted so that only the proper subscriber device can make use of the data. Encryption of other information such as the time displacement key may make use of these encryption capabilities, or additional encryption facilities may be provided by the operators of the locationing service.)

To accomplish the denial of the locating service to all but subscribers, an access controller 53 provides a preselected time displacement 54 to the internal clock controller 48. The packet trigger signal 49 is displaced by this time displacement 54. The time displacement is also provided as coded information to the packet formatter 42 for transmission. When this information is received by an authorized subscriber device 22, it is used as the basis for correcting the received synchronization words 34 for the introduced time displacement 54. Other units that receive the signals sent by the cell sites 24, which are not subscribers and therefore do not have the value of the time displacement transmitted in the encrypted data packet 32, cannot make this correction and therefore cannot determine location. "Time-synchronized", as used herein, is intended to encompass synchronization words or signals transmitted at the same time by different cell sites, and also intentionally time-displaced synchronization words or signals where the intentional time displacement can be used to correct the synchronization information received by the subscriber device.

Figure 7:
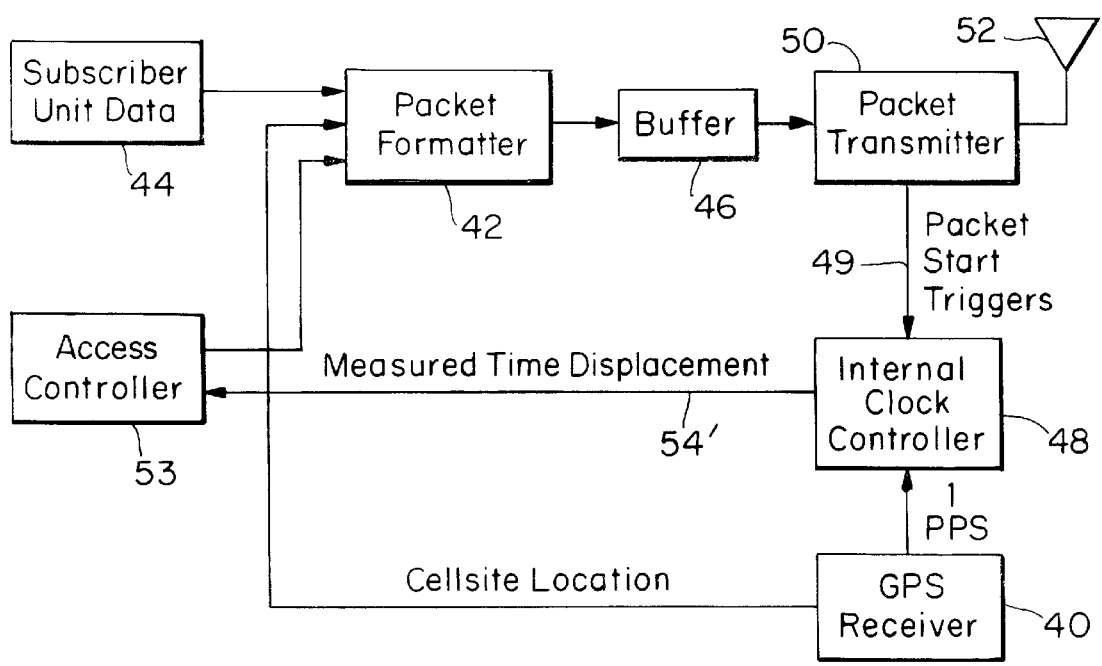
FIG. 7 is a block diagram of an alternative form of the cell site transmitter.

FIG. 7 depicts another embodiment of the cell site transmitter. This embodiment is similar in many respects to that of FIG. 3, and corresponding elements have been assigned like numbers. In this case, however, there is a measured time displacement 54' measured relative to the local clock by the clock controller 48 (as distinct from being commanded by the access controller). The measured time displacement 54' is provided to the access controller 53, which in turn provides it to the packet formatter 42. The measured time displacement 54' is used by the subscriber devices 22 to correct the received synchronization signals, in a manner analogous to the approach described in relation to FIG. 3.

The time-synchronized forward synchronization words 34 received from different cell site transmitters 26 are used (after correction for time displacements 54 and 54', if any) to determine the relative time of flight and thence distance of the subscriber device 22 from the cell site transmitters 26. The subscriber device 22 has no synchronized clocking system such as its own GPS receiver, as this would add significantly to the cost of the subscriber device 22. Instead, an internal counter is synchronized to forward synchronization words 34 received from one of the cell site transmitters 26, and the relative differences in time of flight for the forward synchronization words 34 of the other cell site transmitters 26 are determined from this synchronized counter.

Figure 4:
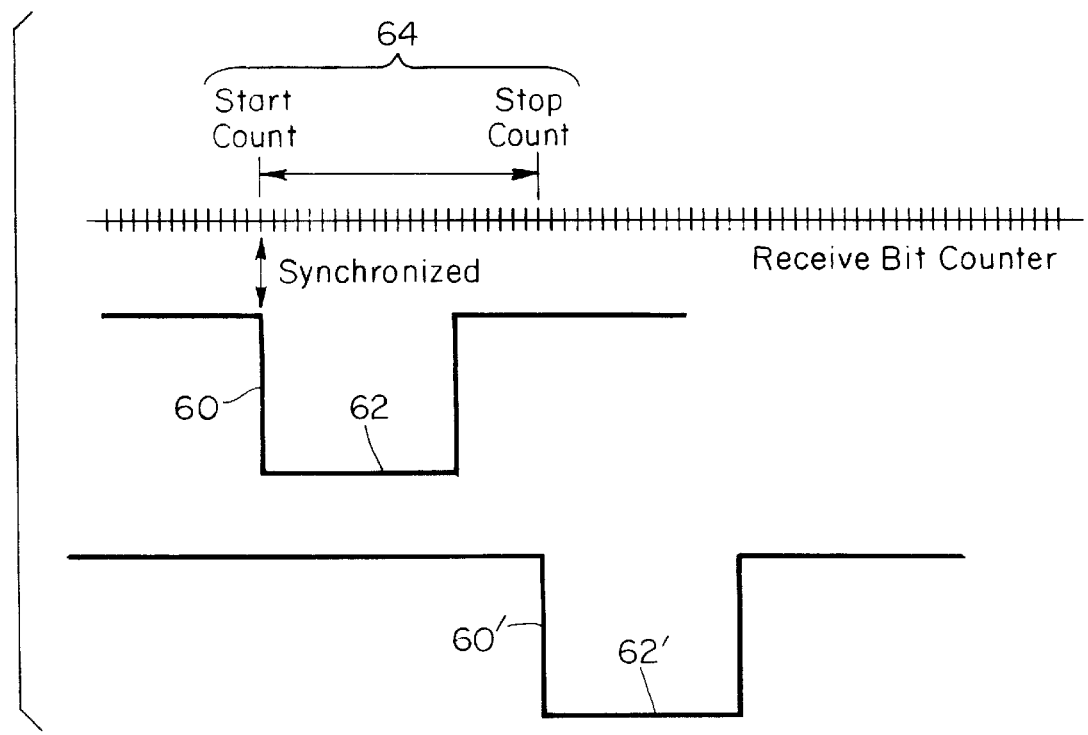
FIG. 4 is a schematic illustration of the determination of the relative time displacement between synchronization signals.

The principle of the determination of relative time of flight is illustrated in FIG. 4. The clock reference (see numeral 82 of FIG. 5) of the subscriber device 22 operates at a much higher rate than the bit rate of the transmitted data. In a preferred embodiment, the clock reference runs at 9.8304 megahertz, which is 512 times the preferred bit rate of 19.2 kbps. (The time duration of one bit at 19.2 kbps is about 50,000 nanoseconds, which corresponds to about 10 miles at the speed of light. Counting bits at the data rate of 19.2 kbps does not provide sufficient time and distance resolution for the present application, necessitating the use of the clock reference operating at a higher rate.) A counter (which will be discussed as the "receive bit counter" in relation to FIG. 5) operating at the speed of the clock reference is synchronized to a recognizable feature of the forward synchronization word 34. Here, for example, the counter starts at a leading edge 60 of a bit 62 of the forward synchronization word 34 transmitted by a first cell site transmitter 26. The counter is stopped when the same leading edge 60' of the corresponding bit 62' of the forward synchronization word 34 transmitted by a second cell site transmitter 26 is received. The number of counts 64 between starting and stopping is the number of 9.8304 megahertz cycles occurring during that period of time, a direct measure of the time interval. The faster the clock reference, the more accurate the relative time measurement. The preferred values of clock reference and bit rate, together with the errors in the system, allow the present approach to measure locations to within about 100 feet.

Figure 5:
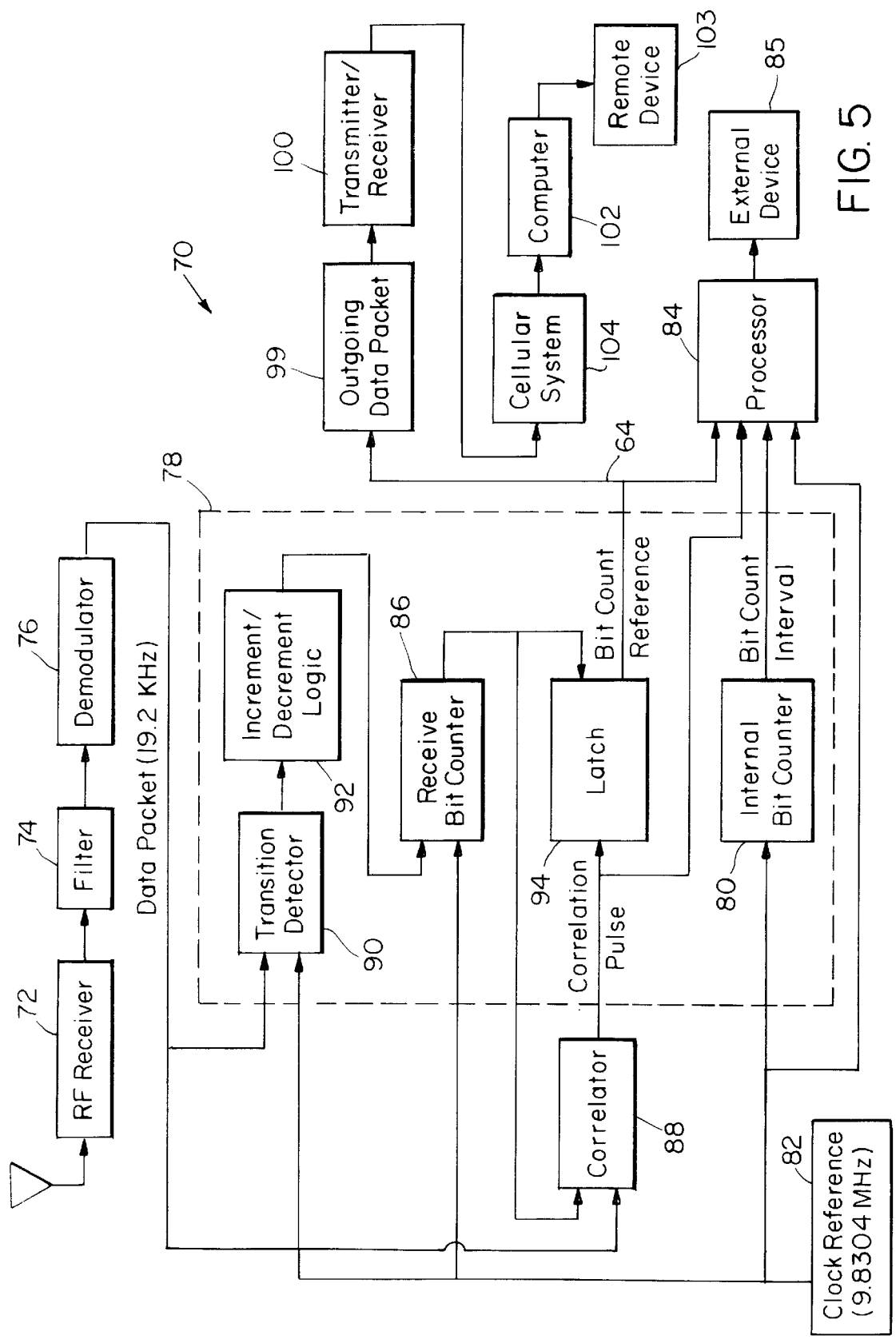
FIG. 5 is a schematic drawing of a subscriber device used with the present invention.

FIG. 5 depicts a digital processing circuit 70 used to implement this time interval measurement approach. The radio frequency signal transmitted by each cell site transmitter 26 is received by a radio frequency receiver 72 which boosts the weak signal up to levels that can be easily processed. The resulting boosted signal is processed by a filter 74 to remove noise and other interfering signals outside the cellular channel of interest. The resulting signal is then demodulated by a demodulator 76 so that the resultant output signal carries only phase information and no amplitude variation.

The forward synchronization word with a bit rate at 19.2 kbps is input to a clock recovery circuit 78 which performs the synchronization and time interval measurement functions. The clock recovery circuit 78 utilizes two counters. The first is an internal bit counter 80 operating from an internal clock reference 82, in the preferred embodiment a 9.8304 megahertz clock. The internal bit counter 80 is used by an internal microprocessor 84 to generate an internal bit count.

The other counter is a receive bit counter 86 which is synchronized to the forward synchronization word 34. To perform the synchronization, the input digital data stream is supplied to a correlator 88, which recognizes the forward synchronization word 34, to which the synchronization is to be made. When that forward synchronization word 34 is recognized, a correlation pulse is output by the correlator.

The input digital data stream is also supplied to a transition detector 90 that detects the correlation feature of interest, such as the leading edge 60 of FIG. 4. The receive bit counter is synchronized by increment/decrement logic 92 to that correlation feature by adding or subtracting time ticks from the clock reference signal 82, to generate the receive bit counter 86. The receive bit counter 86 is a counter operating at the clock reference rate (here 9.8304 megahertz) that is synchronized to the input digital data stream, and to the correlation feature of interest in particular, as required at "Start Count" of FIG. 4.

The receive bit counter 86 continues to count until it is stopped when the correlation feature of interest is found in a second waveform, as discussed in relation to FIG. 4. The counter 86 is stopped when the correlator 88 recognizes that feature and generates the correlation pulse. The correlation pulse operates a latch 94 which captures the value of the receive bit counter at that point, effectively stopping the count (although the receive bit counter itself continues to run). The difference between the receive bit count at "Start Count" and the receive bit count at "Stop Count", the bit count difference 64 of FIGS. 4 and 5, is supplied to the microprocessor 84 as a measure of the time interval or difference in the time of flight of the synchronization signal received from the first cell site transmitter and the time of flight of the synchronization signal received from the second cell site transmitter. This difference in time translates directly into a difference in distance, since the speed of the radio wave, the speed of light, is a constant.

By this approach, the relative differences in distance of the subscriber device 22 from the first and second cell site transmitters 26 is determined, and the relative differences in distance of the subscriber device 22 from the first and third cell site transmitters 26 is determined. The absolute locations of the cell site transmitters 26 are known to the subscriber device 22 through location data which is transmitted using the ordinary data delivery services of the system, or by other means. This information is sufficient to solve a set of conventional triangulation equations in three unknowns which may be represented as, for example, the latitude and longitude of the subscriber device 22, and the distance of the subscriber device 22 from the first cell site transmitter 26 (which may alternatively be thought of as the absolute time take for the synchronization signal to travel from the first cell site transmitter 26 to the subscriber device 22).

The triangulation procedures and equations themselves are well known in the art. See, for example, "A Vehicle Location System (VLS) Solution Approach", by J. Brooks Chadwick and J.L. Bricker, IEEE Position Location and Navigation Symposium, pages 127–132, 1990, whose disclosure is incorporated by reference.

The calculation of the triangulation can be performed by the microprocessor 84 onboard the subscriber device 22. An alternative approach is to encode the relative difference information into an outgoing data packet 99. The outgoing data packet 99 is transmitted by a transmitter 100 within the subscriber device 22, through the cellular transmitter 26 operating in receiving mode, through the cellular system 104 (including the MDBS 28 and the CDPD network 30) to a remote computer 102. The remote computer 102 performs the triangulation calculation which, together with the known locations of the cell site transmitters 26, yields the absolute location of the subscriber device 22. If the location information is required at the location of the subscriber device, it can be transmitted back to the subscriber device as one of the data packets.

Wherever the triangulation calculation is performed, the results may be displayed on an external device 85 driven by the processor 84 of the subscriber device, or a remote device 103 driven by the computer 102. Such devices 85 or 103 could typically take the form of an electronic map or a graphical display showing the location of the subscriber device 22, or a listing of coordinates of the location of the subscriber device 22.

FIG. 6 summarizes the approach for the method of the invention. A subscriber device as described herein is provided, numeral 110. Digital data signals with synchronized common features, preferably synchronized to the GPS timing signal, are transmitted from at least three cell site transmitters 26, numeral 112. The digital data signals are received by the subscriber device, and the relative time difference or interval between pairs of synchronized data signals is determined, numeral 114. The absolute location of the subscriber device is obtained by the triangulation approach and the fixed and known locations of the cell site transmitters 26, numeral 116.

A key feature of the present invention is that the subscriber device requires no absolute time standard, such as a highly accurate clock or even a GPS receiver. Such a time standard of the required accuracy would be too expensive to be placed in subscriber devices otherwise suitable for a wide variety of tracking and locating functions. Such an accurate time standard is required for the cell sites, but these are relatively few in number. The ability to measure time of flight accurately with the present approach permits locating the subscriber device accurately and inexpensively. The locationing feature can be supplied as a pay service to cellular receiver systems, due to the ability to deny access to unauthorized users as discussed previously.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for determining a location of a subscriber device in a wireless cellular communications system, comprising the steps of:
providing a subscriber device having a cellular digital data receiver system with a cellular digital data receiver therein;
transmitting cellular digital data signals to the subscriber device from at least three different cellular cell site transmitters at different but known locations, each data signal containing a time-synchronized synchronization signal, the time-synchronized synchronization signals of the at least three different cellular cell site transmitters being transmitted at the same time or being displaced in time from each other by a known time displacement;
informing the subscriber device of location data representing a location of each of the at least three cellular cell site transmitters;
determining a time of arrival of each of the time-synchronized synchronization signals with respect to an internal clock of the cellular digital data receiver system; and
obtaining the location of the subscriber device from the location data and the times of arrival of the time-synchronized synchronization signals relative to the internal clock.

2. The method of claim 1, wherein the step of transmitting includes the step of
synchronizing the time-synchronized synchronization signals to a timing signal provided by a global positioning system.

3. The method of claim 1, wherein the step of informing includes the step of
incorporating into the cellular digital data signal transmitted from at least one cell site the location data representing the location of each of the at least three cell site transmitters.

4. The method of claim 1, wherein the step of determining includes the steps of
aligning the internal clock of the cellular digital data receiver system to a first one of the time-synchronized synchronization signals transmitted at a first time, and
establishing the arrival times of a second and a third later-transmitted time-synchronized synchronization signals of respective second and third cell site transmitters relative to the aligned internal clock.

5. The method of claim 1, wherein the step of obtaining is performed by the cellular digital data receiver.

6. The method of claim 1, including the additional step of
transmitting the relative time of arrival of each of the time-synchronized synchronization signals to a remote location, and wherein the step of obtaining is performed at the remote location.

7. The method of claim 1, wherein the step of transmitting includes the step of
providing time-synchronized synchronized signals having no intentionally introduced time displacements therein.

8. The method of claim 1, including the additional step of
time displacing at least one of the time-synchronized synchronization signals by a preestablished amount, and
providing the preestablished amount of the time displacing to the step of obtaining, so that the preestablished amount of time displacement may be accounted for in the obtaining of the relative location of the subscriber device.

9. The process of claim 1, wherein the step of providing a subscriber device includes the step of
providing a cellular digital data receiver operable with a Cellular Digital Packet Data format.

10. Apparatus for determining a location of a subscriber device in a wireless cellular communications system, comprising:
at least three cellular cell site transmitters, each of the cellular cell site transmitters including
means for providing a timing signal synchronized to a common time standard, the common time standard being a time standard that is the same for each of the cellular cell site transmitters, and means for transmitting a cellular digital data signal having a time-synchronized synchronization signal synchronized to the timing signal;

a subscriber device having a cellular digital data receiver operable to receive the cellular digital data signal transmitted by the cellular cell site transmitters, means for determining a time of arrival of each of the time-synchronized synchronization signals relative to the internal clock;

means for determining the location of the cellular cell site transmitters; and means for obtaining the location of the subscriber device from the locations of the cellular cell site transmitters and the time of arrival of the time-synchronized synchronization signal at each of the at least three cellular cell site transmitters relative to the internal clock.

11. The apparatus of claim 10, wherein the means for providing a timing signal includes a global positioning system receiver.

12. The apparatus of claim 10, wherein the cellular digital data signal includes information defining the location of the cell site transmitters and the means for determining the location of the cell site transmitters includes means for decoding the data signals to obtain the information defining the location of the cell site transmitters.

13. The apparatus of claim 10, wherein the means for determining the time of arrival includes means for aligning the internal clock to a first one of the time-synchronized synchronization signals received at a first time, and establishing the arrival times of a second and a third later-received time-synchronized synchronization signals of respective second and third cellular cell site transmitters relative to the aligned internal clock.

14. The apparatus of claim 10, wherein the means for obtaining is located within the subscriber device.

15. The apparatus of claim 10, further including means for providing the location of the subscriber device to an external device.

16. The apparatus of claim 10, further including means for transmitting the relative time of arrival of each of the synchronized time-synchronized synchronization signals to a remote location, and wherein the means for obtaining is located at least in part at the remote location.

17. The apparatus of claim 10, wherein the means for transmitting includes means for providing time-synchronized synchronized signals having no intentionally introduced time displacements therein.

18. The apparatus of claim 10, wherein the means for transmitting further includes means for introducing a time displacement into at least one of the time-synchronized synchronization signals by a preestablished amount upon transmittal, and means for providing the preestablished amount of the time displacement to the means for obtaining, so that the time displacement may be accounted for in the obtaining of the location of the subscriber device relative to the locations of the cellular cell site transmitters.

19. The apparatus of claim 10, wherein the cellular digital data receiver is operable with a Cellular Digital Packet Data format.

20. Apparatus for determining a location of a subscriber device in a wireless cellular communications system, the apparatus comprising the subscriber device having a cellular digital data receiver operable to receive cellular digital data signals transmitted by at least three cellular cell site transmitters, each of the cellular digital data signals including a time-synchronized synchronization signal synchronized to a common time standard, the common time standard being a time standard that is the same for each of the cellular cell site transmitters,;

an internal clock;

means for determining a time of arrival of each of the time-synchronized synchronization signals relative to the internal clock; and means for obtaining the location of the subscriber device relative to the at least three cellular cell site transmitters from the times of arrival of the time-synchronized synchronization signals relative to the internal clock.

21. The apparatus of claim 20, wherein the cellular digital data receiver includes a radio frequency receiver operable to receive cellular transmissions, a filter that eliminates noise from the received cellular transmissions, and a discriminator that produces a hard limited signal from the filtered cellular transmissions.

22. The apparatus of claim 20, wherein the means for determining the time of arrival includes means for aligning the internal clock with a correlation feature of a first one of the time-synchronized synchronization signals received by the cellular digital data receiver from a first cellular cell site transmitter, and means for establishing the time increment of receipt of the correlation feature of each of the time-synchronized synchronization signals received from a second and a third cellular cell site transmitter relative to the aligned internal clock, thereby establishing the relative time of receipt of the time-synchronized synchronization signals of the digital data signals relative to the common time standard.

23. The apparatus of claim 22, wherein the correlation feature is a common bit in each of the time-synchronized synchronization signals, and wherein the means for establishing includes means for dividing the bits of each of the second and third time-synchronized synchronization signals into fractional time increments and for establishing a fractional bit interval displacement for each of the common bits.

24. The apparatus of claim 23 wherein the correlation feature is a leading edge of the common bit in each of the time-synchronized synchronization signals.

* * * * *

UNITED STATES PATENT AND TRADEMARK OFFICE
CERTIFICATE OF CORRECTION

| | | |
|---|---|---|
| PATENT NO. | : | 5,815,538 |
| DATED | : | September 29, 1998 |
| INVENTOR(S) | : | Conrad Grell, Jeremy Guralnick, Ilan J. Rothmuller, Chris Bennett and Michael Theiss-Aird |

It is certified that error appears in the above-identified patent and that said Letters Patent is hereby corrected as shown below:

Claim 10: column 11, line 8:

before "means for determining", insert ---an internal clock;---

Signed and Sealed this

Ninth Day of March, 1999

*Attest:*

Q. TODD DICKINSON

*Attesting Officer*     *Acting Commissioner of Patents and Trademarks*